No. 803,912. PATENTED NOV. 7, 1905.
G. W. LOTTRIDGE.
AUTOMATIC WEIGHING MACHINE.
APPLICATION FILED MAY 26, 1903.

4 SHEETS—SHEET 1.

Witnesses:
Lute S. Alter
Harold G. Barrett

Inventor:
George W. Lottridge
By Rector & Hibben
his Attys

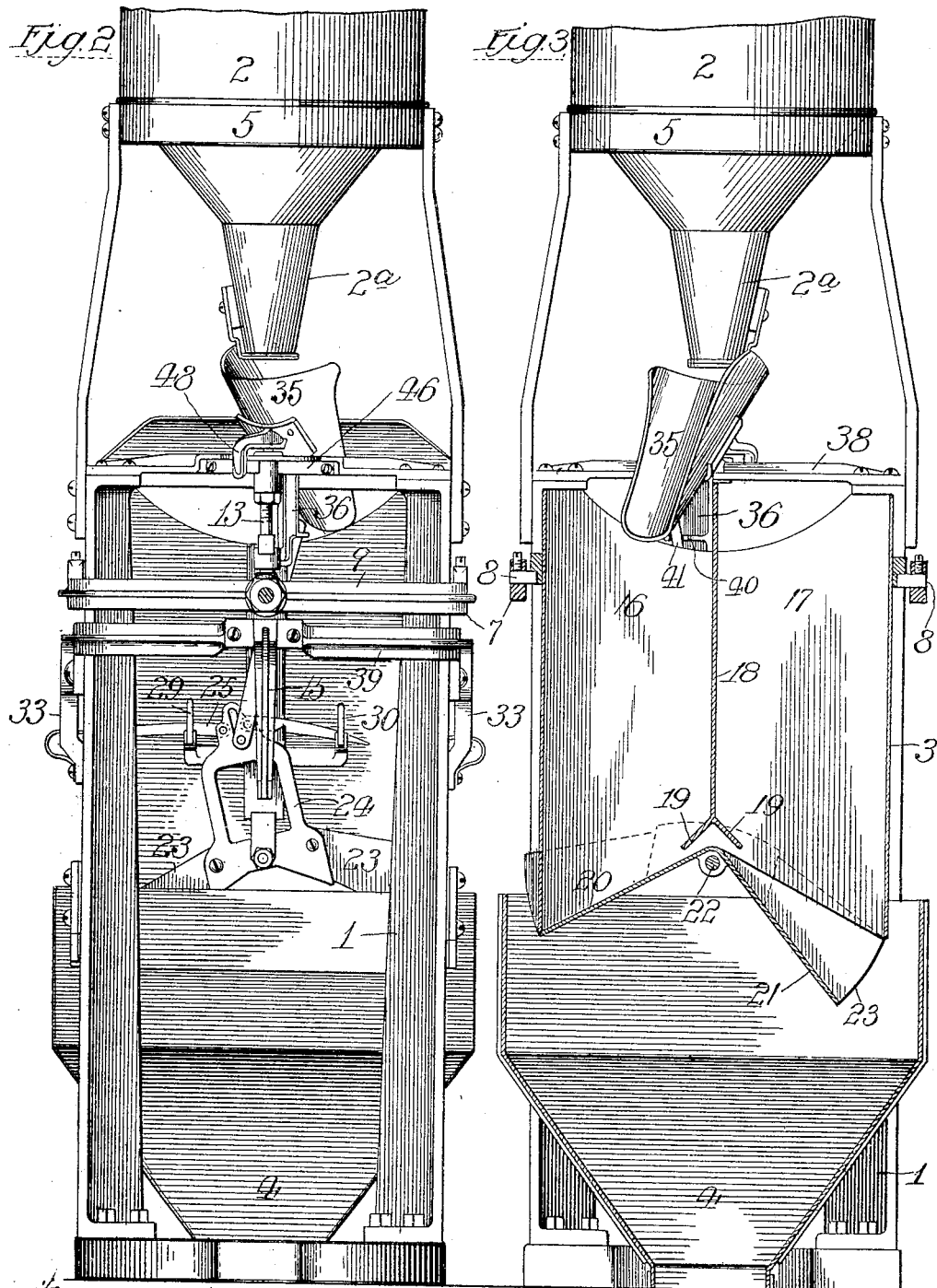

No. 803,912. PATENTED NOV. 7, 1905.
G. W. LOTTRIDGE.
AUTOMATIC WEIGHING MACHINE.
APPLICATION FILED MAY 26, 1903.

4 SHEETS—SHEET 3.

Witnesses:

Inventor.
George W. Lottridge
By Rector & Hibben
his Attys.

No. 803,912. PATENTED NOV. 7, 1905.
G. W. LOTTRIDGE.
AUTOMATIC WEIGHING MACHINE.
APPLICATION FILED MAY 26, 1903.
4 SHEETS—SHEET 4.
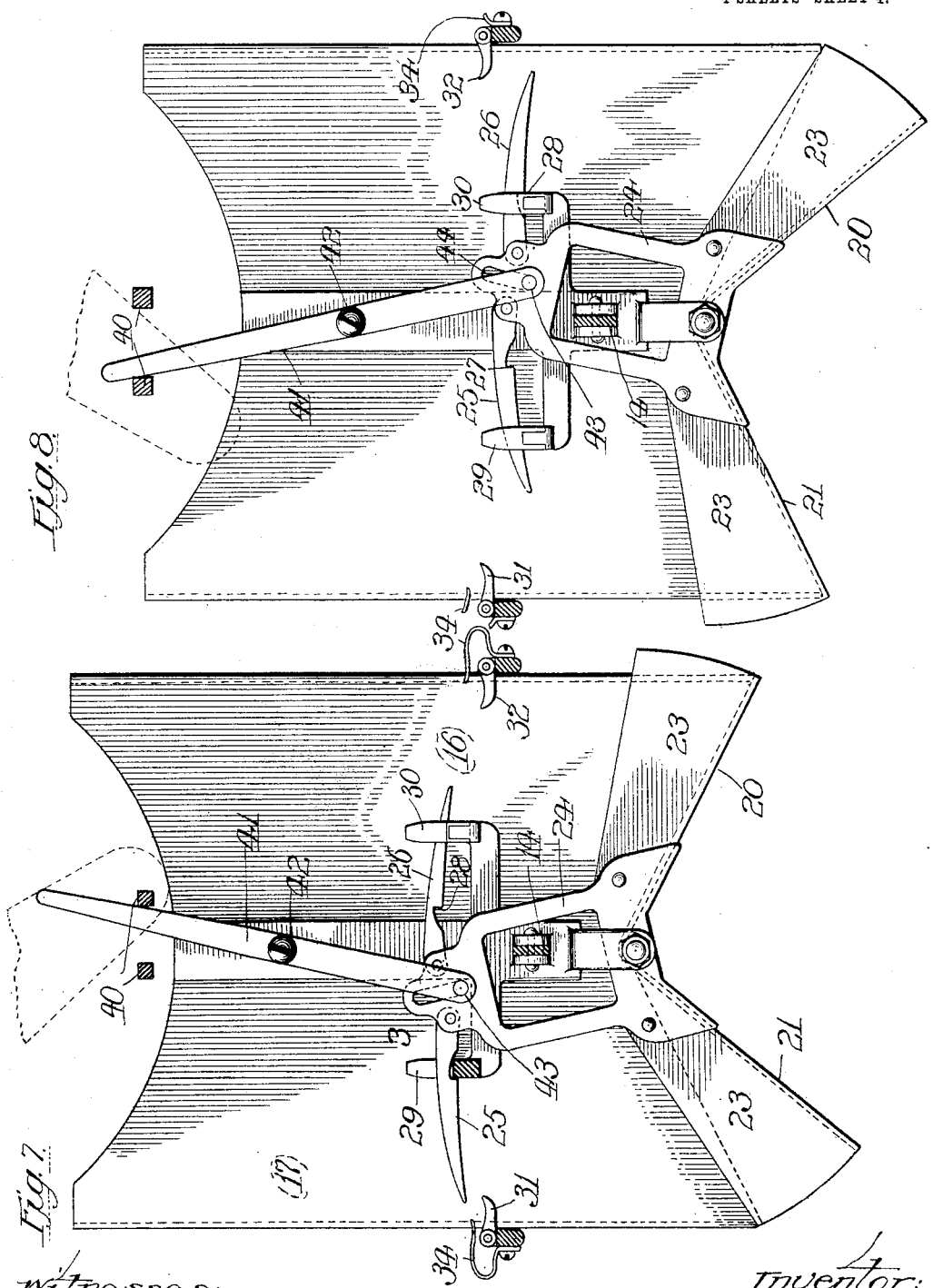
Witnesses:
Lute S. Alter
Harold G. Barrett
Inventor:
George W. Lottridge,
By Rector & Hibben
his Attys.

UNITED STATES PATENT OFFICE.

GEORGE W. LOTTRIDGE, OF NILES, MICHIGAN, ASSIGNOR TO FRANK R. SLEEPER, OF NILES, MICHIGAN.

AUTOMATIC WEIGHING-MACHINE.

No. 803,912.  Specification of Letters Patent.  Patented Nov. 7, 1905.

Application filed May 26, 1903. Serial No. 158,805.

*To all whom it may concern:*

Be it known that I, GEORGE W. LOTTRIDGE, residing at Niles, Berrien county, Michigan, have invented certain new and useful Improvements in Automatic Weighing-Machines, of which the following is a specification.

My invention relates to machines for automatically weighing different articles, more particularly what are known as "packaged" articles—such as cereal foods, sugar, starch, coffee, and the like; and my object is to provide a simple, efficient, and reliable machine of this character whose features of advantage and utility will be apparent from the description hereinafter given.

Figure 1:
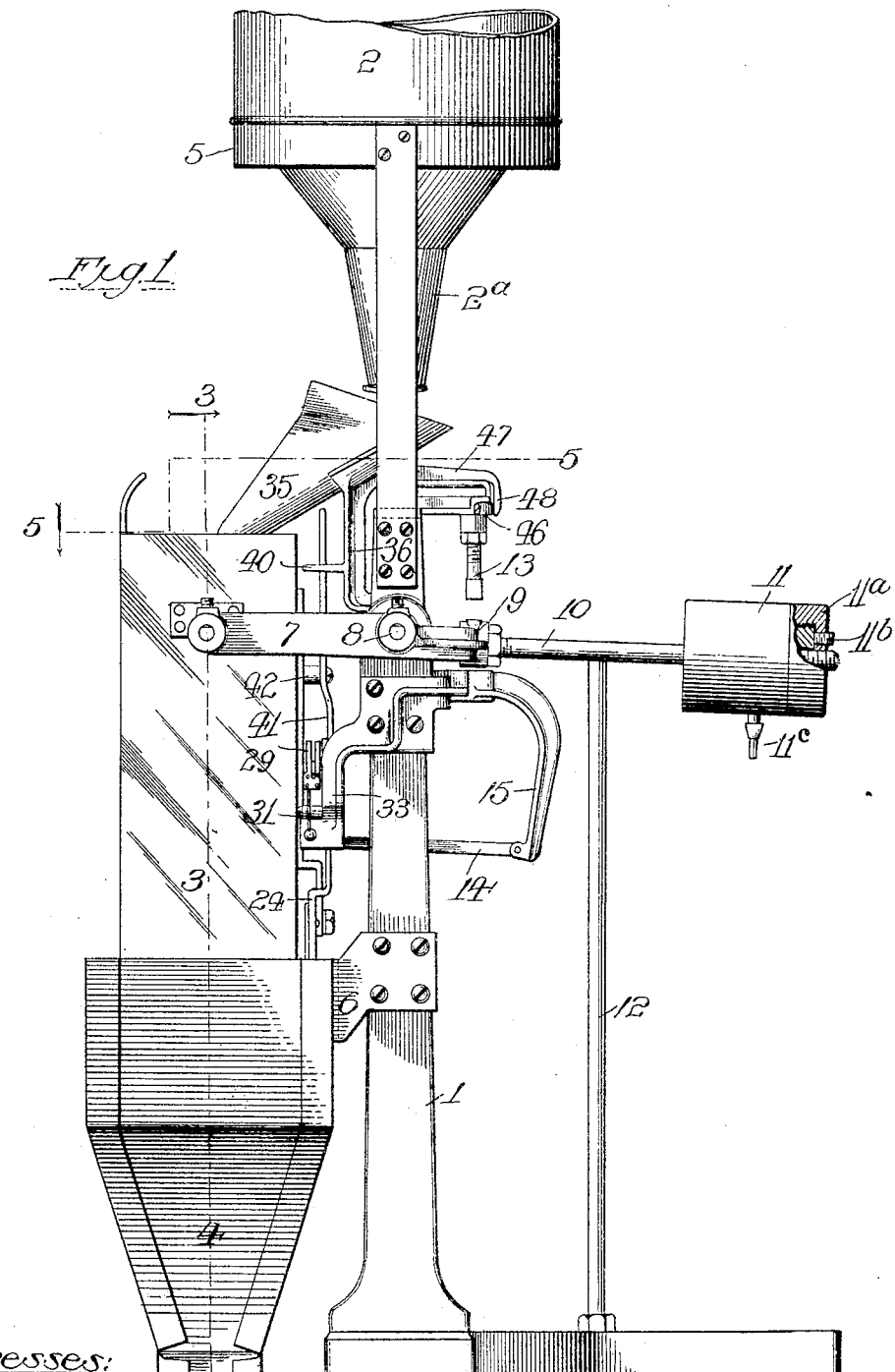
Figure 4:
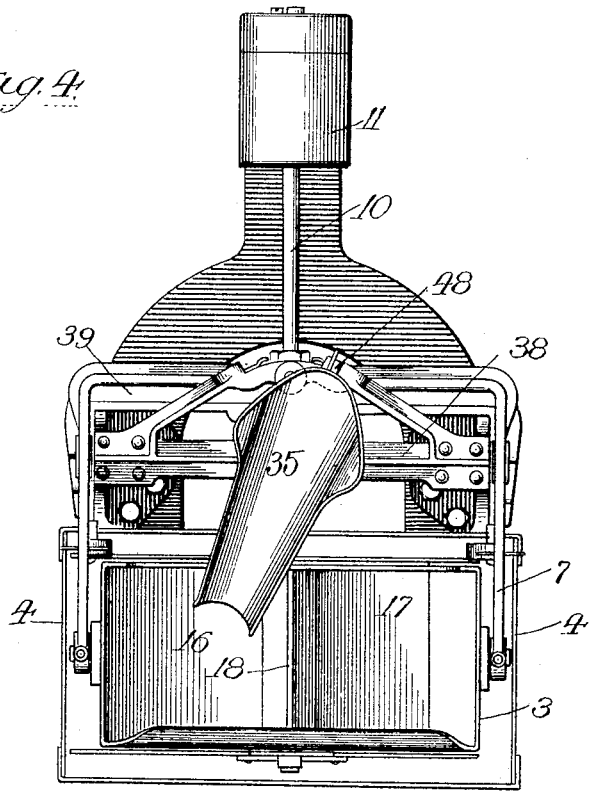
Figure 5:
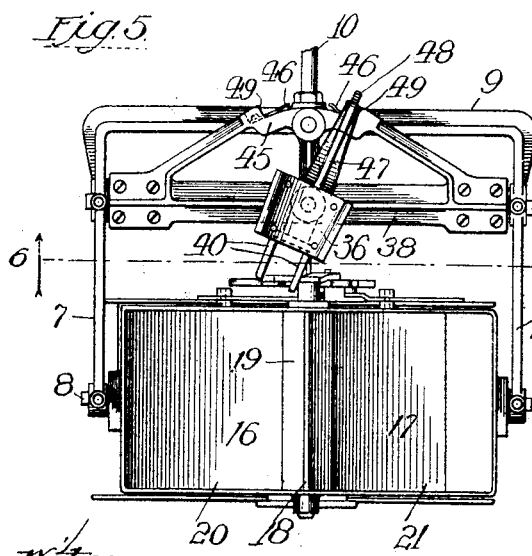
Figure 6:
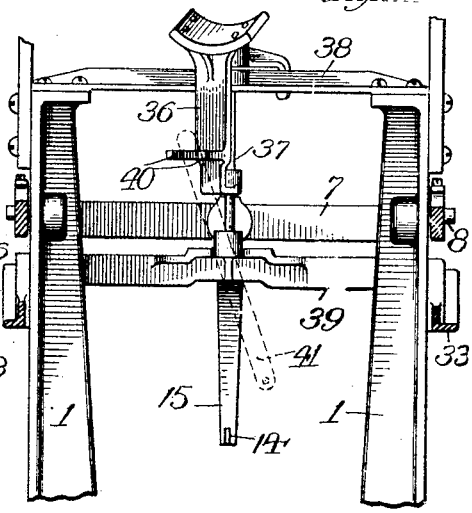

In the drawings, Figure 1 is a side elevation of my weighing-machine; Fig. 2, a rear elevation thereof; Fig. 3, a sectional elevation on line 3 3 of Fig. 1; Fig. 4, a plan view of the machine; Fig. 5, a sectional plan view taken along line 5 5 of Fig. 1 with the spout removed; Fig. 6, a sectional elevation on line 6 6 of Fig. 5; and Figs. 7 and 8, enlarged detail views of the operating mechanism of the machine, showing the parts of such mechanism in different relative positions.

As herein shown, my weighing-machine is provided with a main frame 1 for carrying and supporting the various operating parts, including the supply-hopper 2, weighing-hopper 3, and receiving-hopper 4, all arranged and coöperating in the manner hereinafter explained. The frame 1 is extended upwardly above the level of the weighing-hopper and terminates in a ring 5, adapted to receive and support the supply-hopper, as clearly indicated in Figs. 1, 2, and 3. The lowermost or receiving hopper 4 is connected to the main frame by the bracket-frame 6, which is secured to such main frame in suitable manner.

The weighing-hopper is a movable one, being pivotally supported on the free ends or arms of a U-shaped or bifurcated scale-beam 7, which is itself pivoted to the main frame at the points or bearings 8. The cross-bar member 9 of this U-shaped scale-beam is provided with a rearwardly-extending portion 10, adapted to carry the weights 11, which may be adjusted thereon to weigh up the necessary weight of the article in the weighing-hopper. The downward movement of the rear end of the scale-beam is limited and stopped by contact with a rod or support 12, extending vertically upward from the base of the main frame, Fig. 1, while upward movement is limited by the adjustable bolt 13, depending from the main frame into the path of movement of the cross-bar 9 of the scale-beam. By adjustment of this bolt up or down the range of movement of the scale-beam, and consequently the vertical movement of the weighing-hopper, may be regulated. To prevent swaying of the weighing-hopper and steady its movements, a stay-link 14 is provided, the same being pivoted at one end to the rear side of such hopper and at its other end to a depending bracket or arm 15, secured to the main frame, Fig. 1.

The weighing-hopper is in the present instance rectangular and divided into two separate compartments 16 and 17 by means of a transverse partition 18, Figs. 3, 4, and 5. By preference this partition is provided at its lower end with two oppositely-directed branches or flanges 19, as best seen in Figs. 3 and 4. The compartments 16 and 17 of this hopper have movable and laterally downwardly inclined bottoms 20 and 21, respectively. These bottoms are connected together and arranged to rock on a transverse axis 22. The inclination of these bottoms is such that when one of them is in closed position to close its compartment the other is in open position, as shown in Fig. 3, wherein the bottom 20 is illustrated in closed position and bottom 21 in open position. Wings 23 project upwardly from the sides of the bottoms and extend along the outer faces of the front and rear sides of the weighing-hopper for the purpose of forming chutes in connection with the bottoms to laterally deliver the weighed articles.

The articles are designed to be weighed in and delivered from the compartments alternately in automatic manner, and to this end the following mechanism is provided: A frame or plate 24 is secured to the wings 23 on the rear side of the weighing-hopper, and therefore is adapted to rock on the same axis 22. To this rocking plate are pivoted the two latches 25 and 26, extending laterally in opposite directions and provided, respectively, on their lower edge with the notches 27 and 28. These latches are arranged to slide between the guide-fingers 29 and 30, respectively, which fingers are adapted to engage and retain its latch whenever the latter has reached its extreme lateral or outward movement, with the result that swinging bottoms are held or locked in one position or the other. In order to automatically trip and release the latches from their locked position in the downward movement of the weighing-hopper, I provide a pair of dogs 31 and 32, which are arranged in the path of movement of the latches when shifted to their extreme outward position. These latches are pivoted to depending arms or brackets 33, arranged adjacent opposite sides of the weighing-buckets, as shown in Figs. 1, 4, 7, and 8. These dogs are free to rise to let the latches pass upward without interference, but trip one or the other of the latches on their downward movement. The latches are limited against excess movement by the springs 34.

Below the delivery end or spout $2^a$ of the supply-hopper 2 is arranged a spout or chute 35, which is arranged to oscillate in such manner as to divert the stream of the article to be weighed from one compartment or bucket to the other. In the present instance this spout is secured to a pivoted frame 36, having a downwardly-extending pivoted pin 37 passing through the top cross-bar 38 and bearing in the lower cross-bar 39, all as clearly illustrated in Figs. 5 and 6. This pivoted frame is provided with two forwardly-extending fingers 40, between which operates the vertical lever 41 for shifting the spout 35. Referring to Figs. 7 and 8, this lever is pivoted at 42 to the rear side of the weighing-buckets and is operatively connected at its lower end with the swinging frame 24, hereinbefore described. To compensate for the relative movement of the parts, the lower end of this operating-lever 41 has a pin or stud 43 adapted to work in a slot 44 in the frame 24.

To steady the movement of the spout 35 and hold it with a frictional resistance, the top cross-bar 38 is extended rearwardly and provided with a quadrant portion 45, beyond and parallel with which are arranged two flat springs 46. The pivoted frame, which carries the spout 35, has a rearwardly-extending arm 47, whose extreme free end 48 is downwardly bent or formed so as to play over the quadrant between the limits of the two stops 49, Figs. 1, 2, 4, and 5. This end 48 of the arm 47 slides upon the flat springs described and is thereby held with a frictional resistance.

In explaining the operation of my weighing-machine I will describe a complete cycle of movements of the parts—that is, the automatic filling, weighing, and discharging of the article in both weighing-buckets. Starting with the parts shown in Fig. 3, the supply-hopper 2 delivers a continuous stream of the article upon the spout 35, which is in position to divert such stream into the left-hand bucket or compartment 16. The filling continues until the weight of the contents of such bucket reaches the amount determined by the weight or the adjustment thereof on the scale-beam. The entire weighing hopper or bucket then begins to descend, with the result that the latch 25 is tripped by its dog 31, whereupon the weight of the article upon the bottom 20 will swing the entire bottom structure, opening such bottom 20 to deliver the contents of bucket 16 to the receiving-hopper 4 and by the same movement closing the other bottom 21, so that the bucket or compartment 17 will be ready to receive the article to be weighed. At the end of this movement the latch 26 hooks over the base of the guide-fingers 30 and locks the parts in such shifted position. The movement of the parts as just described also causes an oscillation of the frame 24, which is secured to the bottom structure, whereby the lower end of the upright operating-lever 41 is shifted laterally in one direction, while its upper end is shifted in the opposite direction, with the result that by the contact thereof with the fingers 40 the spout is shifted so as to divert the stream from the bucket 16 to the bucket 17, Fig. 8. During the time of the emptying of the bucket 16 the weighing-hopper rises, owing to the release of its contents; but in its upward movement the latch 26 slips by the dog 32 and assumes a position above such dog. When the bucket 17 is filled to the predetermined extent, the weighing-hopper descends, and as soon as the latch 26 is tripped by its dog 32 the weight of the contents pressing upon the bottom 21 swings the latter open, simultaneously closing the bottom 20 and shifting the spout 35, so as to divert the article into the bucket 16 again. The parts again assume the relative position shown in Fig. 7, and in rising the latch 25 slips by its dog 31 and takes its position above such dog, ready to be tripped thereby on the descent.

The operation above described continues so long as the article to be weighed is delivered to the machine. The operation is thus both a continuous and an automatic one, weighing up the predetermined weight of the article and delivering it into a receiving-hopper, from which it may be run into packages which are brought below the spout of such hopper, as by an endless conveyer or the like.

In order to secure such nicety and accuracy of adjustment as could not be conveniently obtained ordinarily through the medium of the set-screw coöperating with the weight 11 of the scale-beam, I have made the weight in two sections, the outer section or member $11^a$ being arranged to screw upon the outer end of the main member or section, with the result that the member $11^a$ may be screwed or unscrewed with reference to the main member 11 and the parts held in the proper adjusted position by means of a set-screw $11^b$. The main member or section of the weight 11 is arranged to be held to adjusted position on the rod 10 in suitable manner, as by means of the set-screw $11^c$.

I claim—

1. An automatic weighing-machine comprising a movable weighing-hopper having two buckets or compartments always open at their upper ends but alternately closed and opened at their lower ends, connected closures in the lower ends of the buckets, and pivoted and shiftable means for delivering to one or the other of the buckets a constant supply or stream of the article to be weighed, and mechanism actuated by the weight of the contents of the buckets for emptying the latter by operating the closures and automatically shifting said means to deliver said stream into the buckets alternately, said shiftable or delivery means comprising an inclined spout pivoted on a substantially vertical axis.

2. An automatic weighing-machine comprising a movable weighing-hopper having two buckets or compartments always open at their upper ends but alternately closed and opened at their lower ends, and pivoted and shiftable means for delivering to one or the other of the buckets a constant supply or stream of the article to be weighed, said means consisting of a spout pivoted laterally of the hopper with its delivery end extending into the plane of the hopper, a frame supporting the spout and rocking on a vertical axis, and means actuated by the weight of the contents of the buckets for emptying the latter and automatically shifting said frame and its spout to deliver said stream into the buckets alternately.

3. An automatic weighing-machine comprising a movable weighing-hopper having two buckets or compartments always open at their upper ends but alternately closed and opened at their lower ends, and pivoted and shiftable means for delivering to one or the other of the buckets a constant supply or stream of the article to be weighed, said means consisting of a spout secured to a frame and pivoted laterally of the hopper, and means arranged on one side of the hopper and controlled by the movements thereof for automatically shifting the frame and its spout.

4. An automatic weighing-machine comprising a movable weighing-hopper having two buckets or compartments always open at their upper ends but alternately closed and opened at their lower ends, and pivoted and shiftable means for delivering to one or the other of the buckets a constant supply or stream of the article to be weighed, said means consisting of a spout secured to a frame and pivoted laterally of the hopper, and a lever pivoted on one side of the hopper and rocked by the movements of the hopper to automatically shift the spout.

5. An automatic weighing-machine comprising a movable weighing-hopper having two buckets or compartments always open at their upper ends but alternately closed and opened at their lower ends, and pivoted and shiftable means for delivering to one or the other of the buckets a constant supply or stream of the article to be weighed, said means consisting of a spout pivoted laterally of the hopper and provided with projections 40, and a pivoted lever rocked by the movements of the hopper and coöperating with said projections to automatically shift the spout.

6. An automatic weighing-machine comprising a movable weighing-hopper having two buckets or compartments always open at their upper ends but alternately closed and opened at their lower ends, and pivoted and shiftable means for delivering to one or the other of the buckets a constant supply or stream of the article to be weighed, said means consisting of a spout pivoted laterally of the hopper, a lever pivoted on one side of the hopper and coöperating with the spout to shift it, closures for the bottoms or lower ends of the buckets arranged to be alternately opened and closed, means for controlling the operation of said closures, and a swinging plate rocked by the movements of said closures and operatively connected with said controlling means and with said lever.

7. An automatic weighing-machine comprising a movable weighing-hopper having two buckets or compartments, movable bottoms or closures for the lower ends of said buckets, means for locking the bottoms in one position or the other, comprising a pair of latches pivotally connected with the bottoms, and a pair of pivoted dogs for tripping said means to unlock the bottoms when the weighing-hopper is moved by the weight of its contents.

8. An automatic weighing-machine comprising a movable weighing-hopper having two buckets or compartments, movable bottoms or closures for the lower ends of said buckets, means for locking the bottoms in one position or the other, comprising a pair of latches pivotally connected with the bottoms and reciprocated thereby, a main frame in which the hopper is mounted, and dogs pivoted on opposite sides of said frame for tripping said locking means.

9. An automatic weighing-machine comprising a movable weighing-hopper having two buckets or compartments, movable bottoms or closures for the lower ends of said buckets, means for locking the bottoms in one position or the other, said means comprising a pair of latches operating to lock the bottoms alternately and carried by and operatively connected with said bottoms, and means comprising a pair of pivoted dogs coöperating with said latches.

10. An automatic weighing-machine comprising means for delivering a supply or stream of the article to be weighed, a weighing hopper or receptacle, a main frame, a substantially U-shaped scale-beam comprising a cross-bar and parallel arms, said beam, having its parallel arms pivoted to the main frame and pivotally connected to said hopper and having a rod on its cross-bar connecting said arms, adjustable weights on said rod, a spout, a pivoted frame carrying said spout and mounted to rock on a vertical axis in the main frame, means for actuating said pivoted frame, and means actuated by the weight of the contents of the hopper for emptying the same.

11. An automatic weighing-machine comprising means for delivering a supply or stream of the article to be weighed, a weighing hopper or receptacle, a main frame, a substantially U-shaped scale-beam comprising a cross-bar and parallel arms, said beam having its parallel arms pivoted to the main frame and pivotally connected to said hopper and having a rod on its cross-bar connecting said arms, adjustable weights on said rod, a spout, a pivoted frame carrying said spout and mounted to rock on a vertical axis in the main frame, a hook-shaped projection 48 on the spout-frame, an extension-frame from the main frame and having a quadrant portion 45 having springs 46 with which said projection 48 coöperates, and an adjustable stop 13 depending from said extension-frame and coöperating with the scale-beam; substantially as described.

12. An automatic weighing-machine comprising a movable weighing-hopper having two buckets or compartments always open at their upper ends but alternately closed and opened at their lower ends, and pivoted and shiftable means for delivering to one or the other of the buckets a constant supply or stream of the article to be weighed, said means comprising a shiftable spout, a frame pivoted on a vertical axis and supporting the spout, and means controlled by the weight of the contents of the buckets for emptying the latter and shifting the spout.

13. An automatic weighing-machine comprising means for delivering a supply or stream of the article to be weighed, a weighing hopper or receptacle, a main frame, a substantially U-shaped scale-beam having its parallel arms pivoted to the main frame and pivotally connected to said hopper and having a rod on its cross-bar connecting said arms, adjustable weights on said rod, a spout, a pivoted frame carrying said spout and mounted to rock on a vertical axis in the main frame, a hook-shaped projection 48 on the spout-frame, an extension-frame from the main frame and having a quadrant portion 45 having springs 46 with which said projection 48 coöperates, an adjustable stop 13 depending from said extension-frame and coöperating with said rod, and an upright post or rod 12 extending from the base of the main frame and arranged to stop the downward movement of said rod and scale-beam; substantially as described.

14. An automatic weighing-machine comprising a stationary hopper adapted to afford a supply or stream of the article to be weighed, a movable weighing-hopper having two buckets or compartments, an inclined shiftable spout arranged between said hoppers and pivoted laterally of the weighing-hopper but with its delivery end arranged to deliver the stream into the particular bucket presented, bottoms or closures for said buckets movable in unison, a pair of locking-latches for alternately locking the bottoms, a plate connected and movable with the bottoms and on which the latches are pivoted, and a rocking lever forming an operating connection between the spout and the plate, and means for controlling the latches in the movements of the weighing-hopper.

15. An automatic weighing-machine comprising a stationary supply-hopper adapted to afford a supply or stream of the article to be weighed, a movable weighing-hopper having two buckets or compartments, a shiftable spout arranged between said hoppers and laterally of the weighing-hopper and adapted to divert the stream from one bucket to the other, a frame supporting the spout and provided with projections, bottoms for said buckets movable in unison to close one bucket and open the other, locking mechanism controlled by the movements of the weighing-hopper for locking and holding such bottoms in their adjusted or shifted positions, and means for shifting the spout from the filled to the empty bucket when the filled bucket is opened and comprising a rocking lever or arm actuated by said movable bottoms and engaging said projections.

16. In an automatic weighing-machine comprising a movable weighing-hopper having two buckets or compartments always open at their upper ends but alternately closed and opened at their lower ends, and means for delivering to one or the other of the buckets a supply or stream of the article to be weighed comprising a pivoted frame arranged to be rocked in unison with the opening and closing of the lower ends of the buckets, an inclined spout connected at its lower end with said frame and adapted to receive and to deliver the material to the buckets alternately, an arm connected with said pivoted frame and a pair of flat springs coöperating with said arm for holding the latter and the pivoted frame and its spout in their different shifted positions.

17. An automatic weighing-machine comprising a stationary supply-hopper adapted to afford a supply or stream of the article to be weighed, a movable weighing-hopper having two buckets or compartments, a shiftable spout arranged between said hoppers and pivoted laterally of the weighing-hopper and adapted to divert the stream from one bucket to the other, bottoms for said buckets movable in unison, resilient means for imparting a yielding pressure to the spout and tending to hold the latter in its adjusted positions, and means controlled by the contents of the buckets for actuating such bottoms and simultaneously shifting the spout from the filled to the empty bucket.

18. An automatic weighing-machine comprising a stationary supply-hopper adapted to afford a supply or stream of the article to be weighed, a movable weighing-hopper having two buckets or compartments, a shiftable spout arranged between said hoppers and adapted to divert the stream from one bucket to the other, bottoms for said buckets movable in unison to alternately close one bucket and open the other, a locking device operatively connected to said bottoms and adapted to lock them in one position or the other, and means comprising a pair of dogs for tripping the locking device when the weighing-hopper is moved by the weight of its contents said dogs being pivoted and spring-pressed into the path of movement of the locking devices.

19. An automatic weighing-machine comprising a stationary supply-hopper adapted to afford a supply or stream of the article to be weighed, a movable weighing-hopper having two buckets or compartments, a shiftable spout arranged between said hoppers and adapted to divert the stream from one bucket to the other, bottoms for said buckets movable in unison to alternately close one bucket and open the other, a locking device carried by and operatively connected to said bottoms and adapted to lock them in one position or the other, a main frame in which the weighing-hopper is mounted, and pivoted dogs arranged on opposite sides of said frame for tripping the locking device.

20. An automatic weighing-machine comprising a stationary supply-hopper adapted to afford a supply or stream of the article to be weighed, a movable weighing-hopper having two buckets or compartments, a shiftable spout arranged between said hoppers and adapted to divert the stream from one bucket to the other, bottoms for said buckets movable in unison to alternately close one bucket and open the other, a pair of latches operating alternately for locking the bottoms in one position or the other and operatively connected to said bottoms, and means comprising a pair of dogs for tripping the operated latch when the weighing-hopper is moved by the weight of its contents.

21. An automatic weighing-machine comprising a stationary supply-hopper adapted to afford a supply or stream of the article to be weighed, a movable weighing-hopper having two buckets or compartments, a shiftable spout arranged between said hoppers and adapted to divert the stream from one bucket to the other, bottoms for said buckets movable in unison to alternately close one bucket and open the other, a pair of laterally-movable notched latches operatively connected to said bottoms and arranged to be operated alternately for locking the bottoms in one position or the other, projections located on one side of the weighing-hopper and adapted to be engaged by said latches, and means for tripping the operated latch when the weighing-hopper is moved by the weight of its contents.

22. An automatic weighing-machine comprising a stationary supply-hopper adapted to afford a supply or stream of the article to be weighed, a movable weighing-hopper having two buckets or compartments, a shiftable spout arranged between said hoppers and adapted to divert the stream from one bucket to the other, bottoms for said buckets movable in unison to alternately close one bucket and open the other, a pair of laterally-movable notched latches operatively connected to said bottoms and arranged to be operated alternately for locking the bottoms in one position or the other, a pair of guide-fingers located on one side of the weighing-hopper and arranged to guide the latches and engage their notches, and means for tripping the operated latch when the weighing-hopper is moved by the weight of its contents.

23. An automatic weighing-machine comprising a main frame, a movable weighing-hopper pivoted thereto and provided with a pair of buckets or compartments, a spout for delivering the article to be weighed into the hopper, a pivoted frame for supporting the spout, automatically-movable bottoms for the buckets, an oscillating plate connected with said bottoms, and a rocking lever actuated by said plate and operatively connected with said pivoted frame to rock the latter.

24. An automatic weighing-machine, comprising a main frame, a movable weighing-hopper pivoted thereto and provided with a pair of buckets or compartments, a shiftable spout arranged to be rocked to supply the article to be weighed to one bucket or the other, automatically-movable bottoms for said buckets, an oscillating frame connected and movable with said bottoms, and a lever pivoted intermediate its length to the hopper and operatively connected at its ends with said oscillating frame and the spout.

25. An automatic weighing-machine comprising a main frame, a movable weighing-hopper pivoted thereto and provided with a pair of buckets or compartments, a shiftable spout pivoted in said frame and arranged to be oscillated to divert the article to be weighed from one bucket to the other, automatically-movable bottoms for said buckets, an oscillating frame or plate connected to said bottoms, a lever pivoted to one side of the weighing-hopper and at one end operatively connected to said oscillating frame, and fingers on the spout between which the other end of the lever operates.

26. An automatic weighing-machine comprising a weighing-hopper provided with two buckets or compartments, mechanism for emptying the buckets alternately when filled to the desired weight, an oscillating spout controlled by said emptying mechanism for delivering the article to be weighed from one bucket to the other, and springs for holding the spout to its oscillated or shifted position with a yielding pressure.

27. An automatic weighing-machine comprising a weighing-hopper provided with two buckets or compartments, mechanism for emptying the buckets alternately when filled to the desired weight, an oscillating spout controlled by said emptying mechanism for delivering the article to be weighed from one bucket to the other, a main frame in which said hopper and spout are mounted, said frame having a quadrant-shaped portion, flat springs on such portion, and an arm extending from said spout and arranged to press upon said springs, whereby the spout is held with a frictional resistance.

28. In an automatic weighing-machine, a scale-beam having a weight 11 provided with means for securing nicety of adjustment, the same comprising a member $11^a$ arranged to screw upon the end of said weight and a set-screw for securing said weight and member in adjusted positions, in combination with a weighing-hopper coöperating with said beam, and means for automatically filling and emptying the weighing-hopper.

29. An automatic weighing-machine comprising a weighing-hopper having two buckets or compartments, an inclined spout pivoted toward its outer end at a point extraneous of the hopper and at one side of the same to deliver a stream of the article to be weighed into the hopper, a frame pivoted on a vertical axis and supporting the spout, and means controlled by the contents of the buckets for emptying the latter and actuating the spout.

30. An automatic weighing-machine comprising a main frame, a weighing-hopper mounted therein and having two buckets or compartments, an inclined spout pivoted toward its outer end on said frame and at one side of the hopper to deliver an article therein, a frame pivoted on a vertical axis and supporting the spout, and means controlled by the contents of the buckets for emptying the latter and actuating the spout.

31. An automatic weighing-machine comprising a main frame, a weighing-hopper mounted therein and having two buckets or compartments, a rocking frame mounted on said main frame and provided with an arm or finger 48 having a frictional resistance with the main frame, a spout on the rocking frame, and means controlled by the contents of the buckets for emptying the latter and actuating the spout.

32. An automatic weighing-machine comprising a main frame, a weighing-hopper mounted therein and having two buckets or compartments, a rocking frame mounted on said main frame and provided with an arm or finger 48, stops on the main frame arranged to be contacted by said arm to limit the movements of the rocking frame, a spout mounted on the rocking frame and arranged to deliver an article to the hopper, and means controlled by the contents of the buckets for emptying the latter and actuating the spout.

33. An automatic weighing-machine comprising a main frame, a weighing-hopper mounted therein and having two buckets or compartments, a rocking frame mounted on said main frame and provided with an arm or finger 48, stops on the main frame arranged to be contacted by said arm to limit the movements of the rocking frame, a spout mounted on the rocking frame and arranged to deliver an article to the hopper, means for imparting a frictional resistance to the movements of the rocking frame comprising spring 46 arranged to press against said arm 48, and means controlled by the contents of the buckets for emptying the latter and actuating the spout.

34. An automatic weighing-machine comprising a movable weighing-hopper having two buckets or compartments, bottoms for said buckets movable in unison, a plate 24 connected with said buckets, latches 25, 26 pivoted to the plate and adapted to alternately engage the hopper, and means for tripping the latches.

35. An automatic weighing-machine comprising a movable weighing-hopper having two buckets or compartments, bottoms for said buckets movable in unison, a plate 24 connected with said buckets, latches 25, 26 pivoted to the plate and adapted to alternately engage the hopper, and dogs 31, 32, for tripping the latches.

36. An automatic weighing-machine comprising a movable weighing-hopper having two buckets or compartments, bottoms for said buckets movable in unison, a plate 24 connected with said buckets, latches 25, 26, pivoted to the plate, fingers 29, 30, arranged on the hopper and with which such latches coöperate, and dogs 31, 32 for tripping the latches.

37. An automatic weighing-machine comprising a movable weighing-hopper having two buckets or compartments, bottoms for said buckets movable in unison, a plate 24 connected with said buckets, latches 25, 26, pivoted to the plate, means for tripping the latches, a shiftable spout for delivering an article to the hopper and means for shifting such spout comprising a pivoted arm 41 operatively connected at one end with the spout and at its other end with said plate 24.

38. An automatic weighing-machine comprising a movable weighing-hopper having two buckets or compartments, bottoms for said buckets movable in unison, a plate 24 connected with said buckets, latches 25, 26 pivoted to the plate, means for tripping the latches, a shiftable spout for delivering an article to the hopper and means for shifting such spout comprising a pivoted arm 41 operatively connected at one end with the spout and having a stud 43 at its other end, said plate 24 having a slot to receive said stud.

39. An automatic weighing-machine comprising a movable weighing-hopper having two buckets or compartments, bottoms for said buckets movable in unison, a plate 24 connected with said buckets, latches 25, 26, pivoted to the plate, means for tripping the latches, a shiftable spout for delivering an article to the hopper and means for shifting such spout comprising, in connection with projecting fingers 40 on the spout, a pivoted arm 41 whose upper end extends between said fingers 40 and whose lower end is operatively connected with the plate 24.

40. An automatic weighing-machine comprising means for delivering a supply or stream of the article to be weighed, a movable weighing-hopper having a vertical partition 18 dividing such hopper into two buckets or compartments and provided at its lower end with the two branches or flanges 19, separate bottoms 20, 21, formed as a single structure and pivoted on the hopper at a point below said flanges 19, locking mechanism for said bottoms, a pivoted spout, an actuating-plate 24 connected with the bottoms and operatively connected with said locking mechanism and spout.

GEORGE W. LOTTRIDGE.

Witnesses:
S. E. HIBBEN,
LOUIS B. ERWIN.